US011372079B2

(12) United States Patent
Corbett et al.

(10) Patent No.: US 11,372,079 B2
(45) Date of Patent: Jun. 28, 2022

(54) ROTATING RADAR SYSTEM UTILIZING MIMO RADAR PROCESSING

(71) Applicant: NAVICO HOLDING AS, Egersund (NO)

(72) Inventors: Andrew Corbett, Auckland (NZ); Alberto Baroncelli, Florence (IT)

(73) Assignee: NAVICO HOLDING AS, Egersund (NO)

( * ) Notice: Subject to any disclaimer, the term of this patent is extended or adjusted under 35 U.S.C. 154(b) by 343 days.

(21) Appl. No.: 16/520,625

(22) Filed: Jul. 24, 2019

(65) Prior Publication Data

US 2021/0025967 A1 Jan. 28, 2021

(51) Int. Cl.
*G01S 7/03* (2006.01)
*G01S 13/937* (2020.01)

(52) U.S. Cl.
CPC ............ *G01S 7/032* (2013.01); *G01S 13/937* (2020.01)

(58) Field of Classification Search
CPC . G01S 7/032; G01S 7/32; G01S 13/42; G01S 13/44; G01S 13/89; G01S 13/426; G01S 13/4463; G01S 2013/0254; G01S 2013/0245
USPC .................... 342/41, 154, 368, 107, 179, 81
See application file for complete search history.

(56) References Cited

U.S. PATENT DOCUMENTS

| 4,126,866 | A | * | 11/1978 | Pelton | H01Q 15/0013 343/872 |
| 4,308,540 | A | * | 12/1981 | Winegard | H01Q 1/24 343/749 |
| 4,876,554 | A | * | 10/1989 | Tubbs | H01Q 19/138 343/754 |
| 6,903,689 | B2 | * | 6/2005 | Apostolos | H01Q 9/16 343/872 |
| 7,528,613 | B1 | * | 5/2009 | Thompson | H01Q 3/06 324/637 |
| 8,009,080 | B2 | * | 8/2011 | Mizutani | H01Q 25/00 342/137 |
| 8,248,298 | B2 | * | 8/2012 | Lalezari | H01Q 21/24 342/120 |
| 8,284,110 | B2 | * | 10/2012 | Elliot | H01Q 9/28 343/727 |
| 8,446,326 | B2 | * | 5/2013 | Tietjen | H01Q 9/12 343/882 |

(Continued)

FOREIGN PATENT DOCUMENTS

CN    109088158 A  *  12/2018  ............. H01Q 1/246

OTHER PUBLICATIONS

De Bruijn; "AESA Radars Using Dual-Axis Multibeam Scanning;" Saudi Symposium for RADAR Technology; Dec. 10, 2014; retrieved Aug. 8, 2019 from http://tangentlink.com/wp-content/uploads/2014/12/4.-AESA-radars-using-Dual-axis-Multibeam-Scanning.pdf.

*Primary Examiner* — Erin F Heard
*Assistant Examiner* — Michael W Justice
(74) *Attorney, Agent, or Firm* — Nelson Mullins Riley & Scarborough LLP (57) ABSTRACT

A radar system deploys a MIMO antenna assembly containing arrays of antenna elements. The MIMO antenna assembly may be rotated by a rotational assembly. Control circuitry may be used to form one or more beams. Receiver antennae may receive reflected signals transmitted by transmitter antennae. The received signals may be processed to generate a radar image. This radar system may be used in a marine vessel.

16 Claims, 8 Drawing Sheets

(56) References Cited

U.S. PATENT DOCUMENTS

| | | | | |
|---|---|---|---|---|
| 8,570,210 B1* | 10/2013 | Fonder | G01S 13/02 | 342/25 B |
| 8,587,470 B2* | 11/2013 | Shirakawa | G01S 13/42 | 342/25 R |
| 9,007,432 B2* | 4/2015 | Chuang | G08B 13/19682 | 348/39 |
| 10,168,419 B2* | 1/2019 | Trummer | G01S 7/41 | |
| 10,306,186 B2* | 5/2019 | Chuang | H04N 5/23238 | |
| 10,754,020 B2* | 8/2020 | Holt | G01S 13/426 | |
| 10,775,498 B2* | 9/2020 | Vacanti | G01S 13/4472 | |
| 2005/0099336 A1* | 5/2005 | Apostolos | H01Q 9/30 | 343/872 |
| 2009/0267835 A1* | 10/2009 | Tietjen | H01Q 3/02 | 342/368 |
| 2010/0141527 A1* | 6/2010 | Lalezari | H01Q 21/08 | 342/368 |
| 2010/0212656 A1* | 8/2010 | Qiu | F24S 60/10 | 165/4 |
| 2010/0253574 A1* | 10/2010 | Mizutani | H01Q 3/2605 | 342/372 |
| 2011/0298679 A1* | 12/2011 | Elliot | H01Q 9/40 | 343/727 |
| 2012/0169842 A1* | 7/2012 | Chuang | G08B 13/19682 | 348/E7.001 |
| 2015/0260836 A1* | 9/2015 | Hayakawa | G01S 13/345 | 342/368 |
| 2015/0271453 A1* | 9/2015 | Chuang | H04N 5/23238 | 348/39 |
| 2016/0025839 A1* | 1/2016 | Trummer | G01S 13/931 | 342/188 |
| 2017/0104276 A1* | 4/2017 | Vacanti | H01Q 1/525 | |
| 2017/0160389 A1* | 6/2017 | Vacanti | H01Q 1/42 | |
| 2018/0143314 A1 | 5/2018 | Pelletier et al. | | |
| 2019/0064338 A1* | 2/2019 | Holt | H01Q 1/525 | |
| 2019/0097328 A1* | 3/2019 | Yong | H01Q 21/245 | |
| 2019/0238800 A1* | 8/2019 | Chuang | G08B 13/19619 | |
| 2020/0341132 A1* | 10/2020 | Holt | G01S 7/411 | |

* cited by examiner

ROTATING RADAR SYSTEM UTILIZING MIMO RADAR PROCESSING

BACKGROUND OF THE INVENTION

Marine vessels may use a number of different navigational aids. For instance, some marine vessels may deploy radar where radar signals are emitted from the radar and reflected signals are received back to identify objects in the environment surrounding the marine vessels. Radar may help a marine vessel safely navigate a course through unknown bodies of water and/or during periods of decreased visibility (e.g., at night, in a fog, etc.). Radar may be especially useful in crowded waters or in waters that have a number of possible obstructions. The radar may also assist in identifying moving objects near a marine vessel.

SUMMARY

Exemplary embodiments provide improved radar capabilities that are especially suitable for marine vessels, such as recreational or commercial marine vessels. The radar system may include a multiple input multiple output (MIMO) antenna assembly. The use of the MIMO antenna assembly may provide a number of advantages. As will be explained below, the use of the MIMO antenna assembly enables the radar to be of a smaller size than a conventional radar system. This may be especially beneficial when used on smaller marine vessels. Adaptive beamforming techniques may be used with the MIMO antenna assembly. This may improve the effective beam width of the radar resulting in an image that surpasses the resolution and clarity of much larger open arrays. In addition, the use of the MIMO antenna assembly may allow multiple beams to be formed at once. This makes it possible to rotate the antenna assembly at a much higher speed than found in conventional systems. In addition, this may enable for a longer dwell on a target to improve target detection performance and to improve the identification of sea clutter. The longer dwell also allows for better Doppler resolution, and makes it easier to discriminate slow moving targets from stationary targets.

In accordance with an exemplary embodiment, a marine MIMO radar system includes a MIMO antenna assembly comprising at least two transmitting antennae for transmitting signals and multiple receiving antennas, for receiving reflected signals. Each of the antennae may include one or more antenna elements, for example micro-strip patches, in order to achieve desirable beam-width characteristics. The marine MIMO radar system may also include control circuitry for controlling the MIMO antenna assembly to perform beamforming.

The marine MIMO radar system may have the transmitting antennae and the receiving antennae co-located such that the antennae are located in a same vertical plane. Each transmitting antenna may have a single element, or may have multiple elements. At least one of the antennae may act as both one of the transmitting antennae and as one of the receiving antennae.

The marine MIMO radar system may deploy adaptive beamforming using multiple signal classifier (MUSIC) adaptive beam forming, estimation of signal parameters via rotational invariance technique (ESPRIT) adaptive beamforming or minimum variance distortionless response (MVDR) adaptive beamforming. The radar marine MIMO system may have a housing with a diameter of less than 25 inches.

In accordance with an exemplary embodiment, a system includes a MIMO antenna assembly. The MIMO antenna assembly includes at least two transmitting antennae for transmitting signals and receiving antennae for receiving reflected signals. The system also includes a control circuitry for controlling the MIMO antenna assembly to perform beamforming. Still further, the system includes a rotational assembly for rotating the MIMO antenna assembly over a range. The system includes a marine electronic device for display of a radar image from the rotating MIMO antenna assembly.

The rotational assembly may rotate the MIMO antenna assembly through a continuous arc of at least 180 degrees. In some embodiments, the rotational assembly rotates the MIMO antenna assembly through a continuous arc of 360 degrees. The rotational assembly may rotate the MIMO antenna assembly at speeds greater than a 20 rotations per minute. The MIMO antenna assembly may have a diameter of less than 13 inches in some embodiments.

In accordance with an exemplary embodiment, a method is practiced where a rotating MIMO marine radar assembly is caused to emit multiple signals forming at least one beam. Reflected signals are received at the MIMO marine radar assembly. The received reflected signals are processed with electrical processing logic to generate video output of at least one object off of which the signals reflected. The video output may be displayed on a display device. The MIMO marine radar assembly may be rotating when emitting signals or when receiving reflected signals. Multiple beams may be formed by the emitted signals.

DETAILED DESCRIPTION

Exemplary embodiments may deploy a marine MIMO antenna radar system. The use of the MIMO antenna radar system enables the size of the radar system to be reduced and may reduce production costs as well. This may be useful, especially with smaller marine vessels (e.g., recreational marine vessels). In addition, beamforming techniques may be deployed to enable faster rotation of the radar and to increase the time that a beam may dwell on objects. Increasing the time that the radar beam dwells on an object may improve the target detection performance. The longer time that a beam may dwell also may allow for better Doppler resolution to easily discriminate slow moving targets from stationary land targets or the like. Adaptive beamforming technologies may be deployed, and multiple beams may be generated at once. The adaptive beamforming technologies may cause the effective beam width of the radar to be improved, resulting in higher resolution and clarity of the radar images.

The MIMO antenna assembly may be positioned on a rotational assembly to rotate continuously through a complete rotation or through a selected arc.

In single input single output (SISO) radar systems, a single transmitter transmits a signal that is directed toward an object. The signal reflects off the object and is received by a single receiver. In contrast, with MIMO, there are multiple orthogonal signals sent from at least two transmitters that are received by multiple receivers. The signals are orthogonal so that they can be discriminated when the reflected signals are received by the receivers. Different techniques may be provided to realize the orthogonality. Among the techniques are time division multiple access (TDMA) and orthogonal frequency division multiplexing (OFDM).

One of the benefits of using a MIMO radar is that it allows the radar antenna assembly to be smaller. The MIMO radar antenna assembly acts as a much larger virtual array, as will be described in more detail below. In a MIMO radar antenna assembly, mutually orthogonal signals are transmitted from multiple transmit antennae and the orthogonal signals can be extracted from each of the receiver antennae. Thus, if a MIMO antenna assembly has three transmitter antennae and four receiver antennae, twelve signals can be extracted from the receiver antennae because of the orthogonality of the transmitted signals. This means that an equivalent twelve antennae would need to be employed in a conventional radar system to achieve the same result. Instead, some embodiments of the present invention can achieve that result with only seven antennae by employing digital signal processing on the received signals—thereby decreasing the required footprint of the overall antenna assembly and, thus, the cost (e.g., of the various components).

Each transmitter antenna and each receiver antenna may have one element or may have multiple elements, such as micro-strip patch elements.

The MIMO radar system may be a continuous wave (CW) system. In a CW radar system, continuous wave radio energy is transmitted and received from any reflecting objects. In Frequency Modulated Continuous Wave (FMCW) radar, the continuous wave that is transmitted is frequency modulated. Embodiments described herein may be FMCW systems. Time Division Multiple Access (TDMA) may be applied to the radar signals in some embodiments. In TDMA, a same frequency channel may be shared by dividing a signal into different time slots. Each transmitter may transmit a time circulating copy of the signal.

Figure 1A:
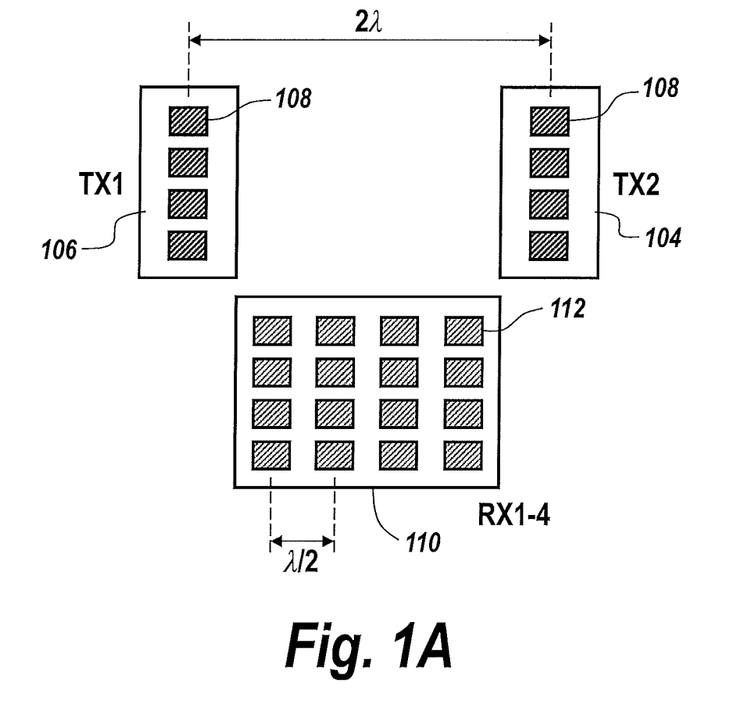
FIG. 1A shows an illustrative MIMO antenna assembly having two transmit antennae and four receive antennae that are suitable for practicing an exemplary embodiment.

FIG. 1A shows an example of a MIMO antenna assembly 100 that may be used in exemplary embodiments. There are two transmitter antennae 104 and 106 in the MIMO antenna assembly system 100. The transmitter antennae 104 and 106, each include four elements 108 that may emit output. The MIMO antenna assembly 100 includes four receiver antennae 110. In the depiction of FIG. 1A, each receiver antenna has four elements 112 arranged vertically in a column. Thus, there are four receiver antennae and two transmitter antennae in the MIMO antenna assembly 100 of FIG. 1A.

It should be appreciated that each transmitter antenna may have only a single element is some embodiments. Moreover, a different number of antennae than shown in FIG. 1A may be used in alternative embodiments.

Figure 1B:
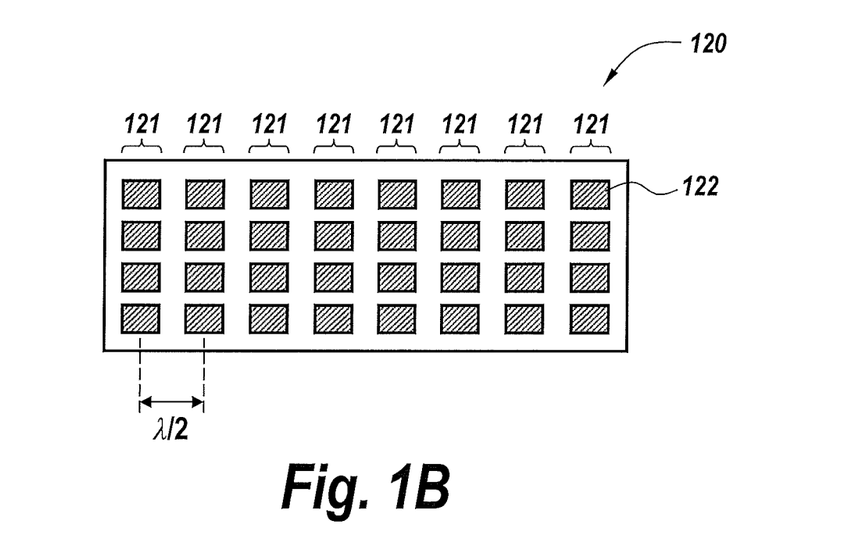
FIG. 1B shows the corresponding virtual array associated with FIG. 1A.

FIG. 1B shows the virtual (e.g., theoretical) array antenna 120 associated with the physical assembly of FIG. 1A. With the MIMO antenna assembly, the antenna assembly acts as if there are eight receiver antennae because each of the receiver antennae may receive two signals. The virtual array antenna 120 shown in FIG. 1B has eight receiver antennae 121 with each receiver antenna antennas 121 containing four elements 122. Because the MIMO antenna assembly has the virtual array of a larger size, the dimensions of the MIMO antenna assembly may be kept smaller than otherwise would be required.

Figure 2A:
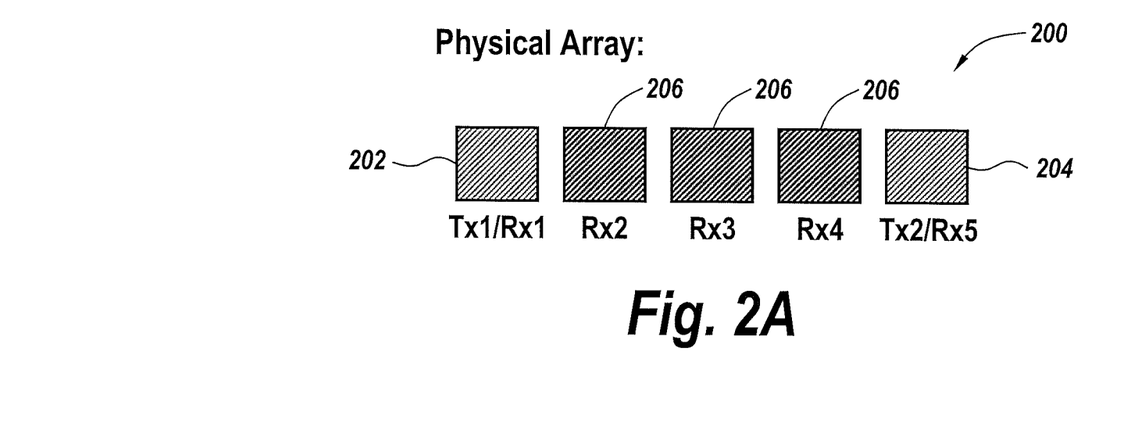
FIG. 2A depicts an example of a MIMO antenna assembly that is suitable for practicing an exemplary embodiment having two antennae to serve as both transmitters and receivers as well as three receivers.
Figure 2B:
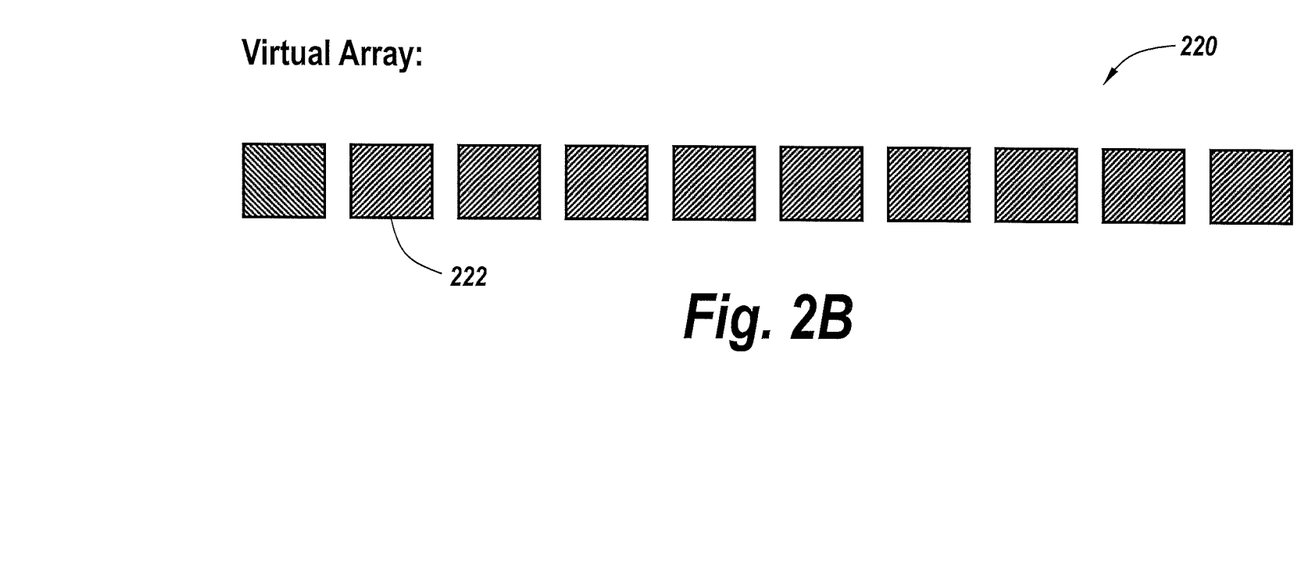
FIG. 2B shows a virtual (e.g., theoretical) array corresponding to the physical assembly of FIG. 2A.

The effect of having a larger virtual array is not limited to instances in which the MIMO antennae are dedicated strictly to transmitting or strictly to receiving. As shown in FIG. 2A, a physical MIMO antenna assembly 200 includes five antennae with antennae 202 and 204 acting as both transmitters and receivers, while antennae 206 solely act as receiving antennae. The resulting virtual array antenna 220 is shown in FIG. 2B. The virtual array antenna 220 contains ten receiver antennae 222. As a result of this phenomena, the size of the radar antenna assembly may be reduced.

Figure 3:
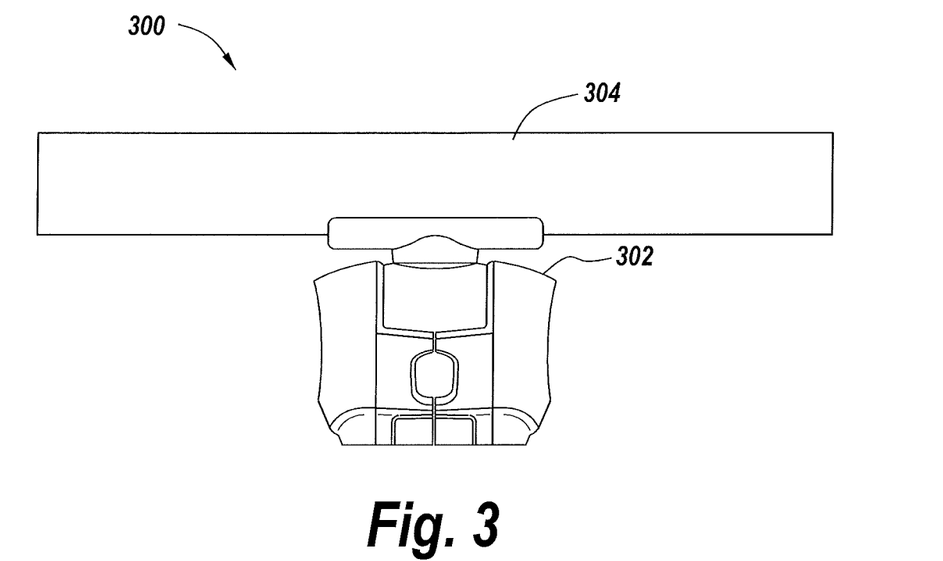
FIG. 3 shows an example of components found in implementation in which an antenna assembly rotates on top of a pedestal.

FIG. 3 shows one example configuration for the housing and other components for a MIMO marine radar system in exemplary embodiments. In the depiction shown in FIG. 3, the MIMO marine radar system 300 includes a rotating antenna portion 304 as well as a pedestal 302 on which the rotating antenna is mounted. A rotational assembly containing an electrical motor and appropriate gearing for rotating the antenna portion 304 may be located within the pedestal 302. The pedestal 302 may be secured to an appropriate location on a marine vessel or other type of vessel.

Figure 4:
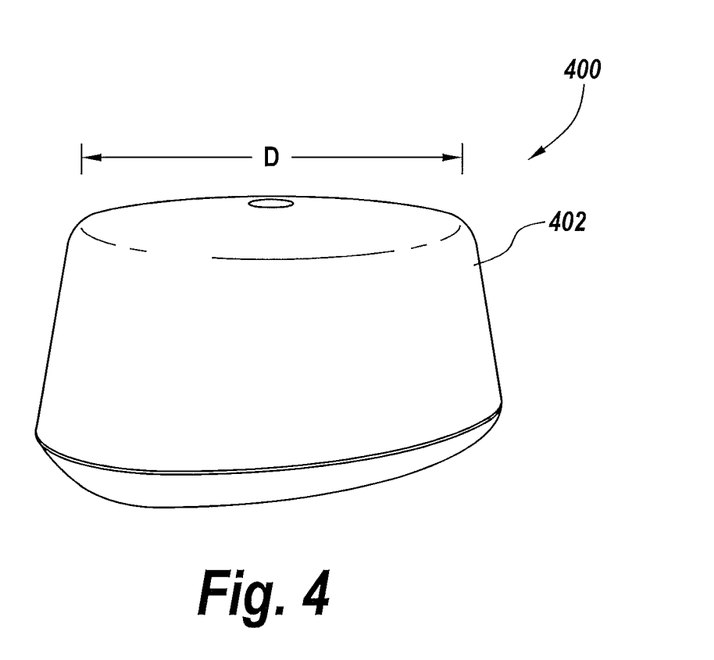
FIG. 4 shows an example of the housing for a domed configuration of a radar that is suitable for an exemplary embodiment.

Alternatively, the housing may be a domed configuration 400, such as depicted in FIG. 4. The domed housing 402 houses the MIMO antenna assembly and the rotational assembly. Other electronic components may also be located within the domed housing 402. As was mentioned above, the use of the MIMO antenna assembly allows for a smaller diameter configuration. As a result, the domed configuration 400 may have a diameter of less than 25 inches, such as 24 inches or 18 inches in diameter. It will be appreciated that other diameters may be utilized. For instance, in some instances a 12 inch diameter configuration may be utilized. Other diameters less than 19 inches may be realized in some embodiments.

Figure 5:
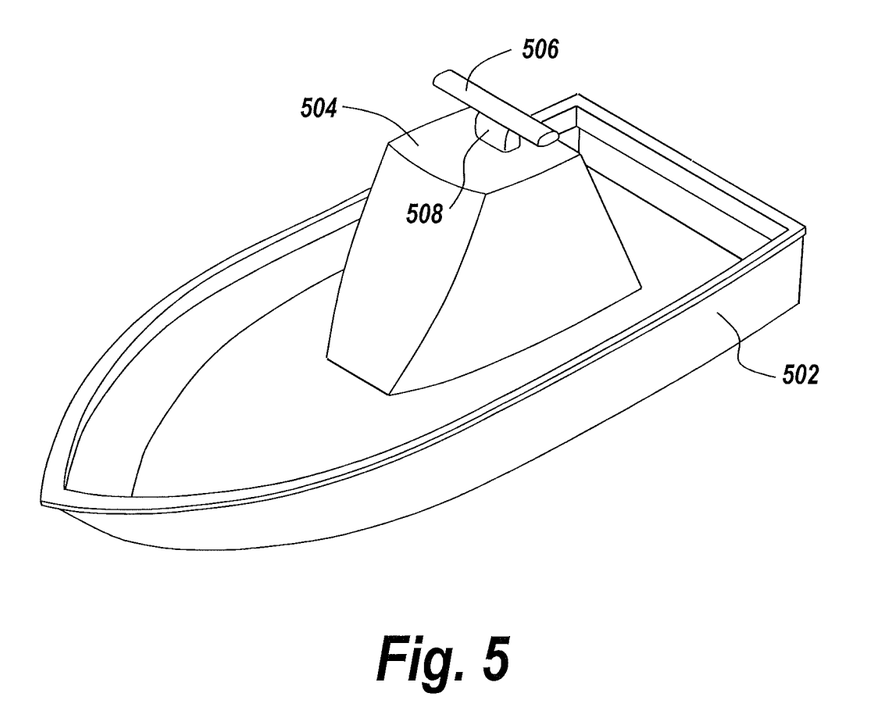
FIG. 5 shows an example of a rotating antenna with a pedestal configuration mounted to a top surface of a marine vessel.

FIG. 5 shows an example in which a rotating antenna portion 506 and a pedestal 508 are mounted on a top surface 504 of a marine vessel 502. The antenna portion 506 may rotate as the marine vessel 502 travels through waterways to emit signals and receive the reflected signals to provide radar imaging of the surrounding environment.

As was mentioned above, the use of the MIMO array assembly may form multiple beams at once using adaptive beam forming technologies as will be discussed below. As a result, the MIMO antenna assembly may be rotated at a higher speed than a conventional radar array. Conventional radar systems typically rotate about a 20 rotations per minute (RPM). Thus, the marine MIMO radar system may rotate at speeds greater than 20 RPM.

Figure 6:
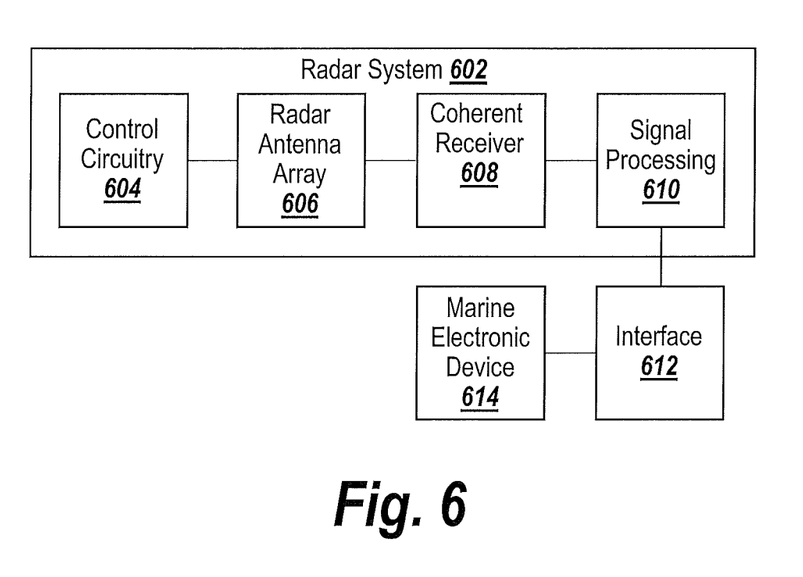
FIG. 6 depicts a number of components found in a radar system and an associated components in an exemplary embodiment.

FIG. 6 depicts a block diagram 600 of the radar system and associated components in an exemplary embodiment. The radar system 602 includes control circuitry 604. The control circuitry 604 is responsible for controlling activity of the radar antenna assembly 606. The control circuitry 604 may be realized in a number of different forms. For example, the control circuitry 604 may be realized as electrical circuitry, such as a field programmable gate array (FPGA), as an application specific integrated circuit (ASIC), as a controller, as a microprocessor or in various combinations thereof. In general, the control circuitry 604 is responsible for providing signals that control activity of the radar antenna assembly 606.

The MIMO radar antenna assembly 606 generates signals and receives the reflected signals. These reflected signals are passed through a RF activity detector 608. The coherent receiver 608 is responsible for identifying radio frequency input that is received by the receiving arrays of the radar antenna array 606 and generating an output. The signal processing 610 processes the output. These outputs may be passed via interface 612 to a marine electronic device 614 that may display the radar image or do other processing of the radar output.

Figure 7:
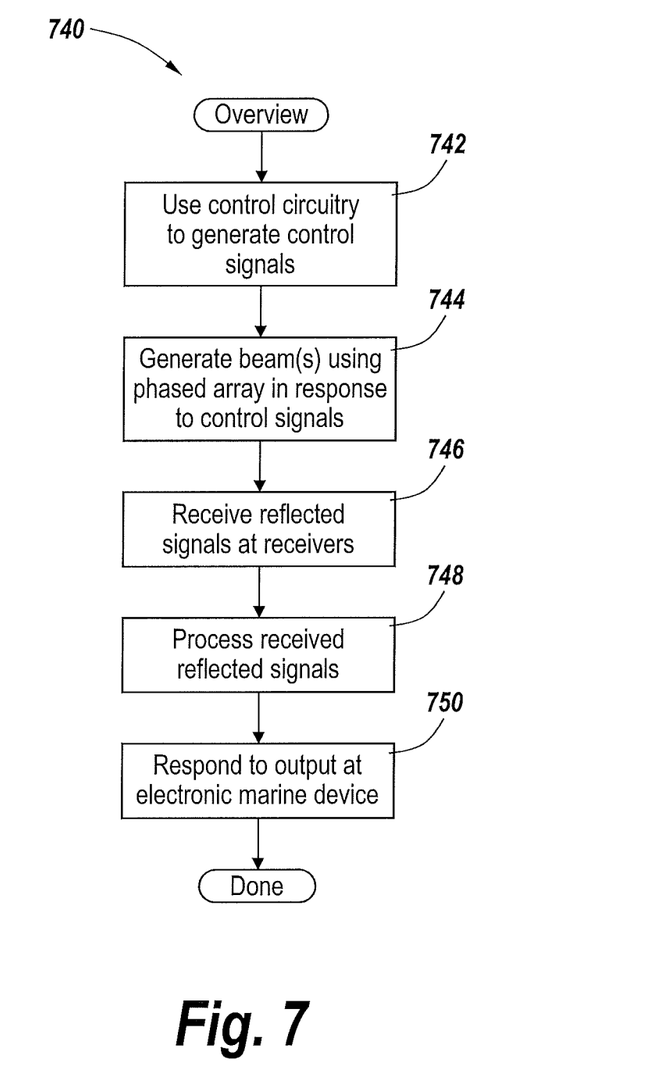
FIG. 7 is a flowchart illustrating steps that may be performed in an exemplary embodiment.

FIG. 7 is a flowchart 740 that provides an overview of the steps that are performed in an exemplary embodiment. Initially, the control circuitry generates control signals (step 742) that are applied to the radar antenna assembly 606. In response to receiving the control signals, the radar antenna assembly 606 generates one or more beams from the output signals (step 744). The receiving antennas of the radar antenna assembly 606 receives the reflected signals that have bounced off objects (step 746). These received reflected signals are processed by the coherent receiver 608 and the signal processing component 610 (step 748). Ultimately, the marine electronic device 614 may react to the radar output, such as by displaying the radar output (step 750). The radar outputs may also be used to generate alerts, or to make other decisions as appropriate. As will be described below, the marine electronic device 614 may include processing logic for determining what to do with the radar output.

Figure 8:
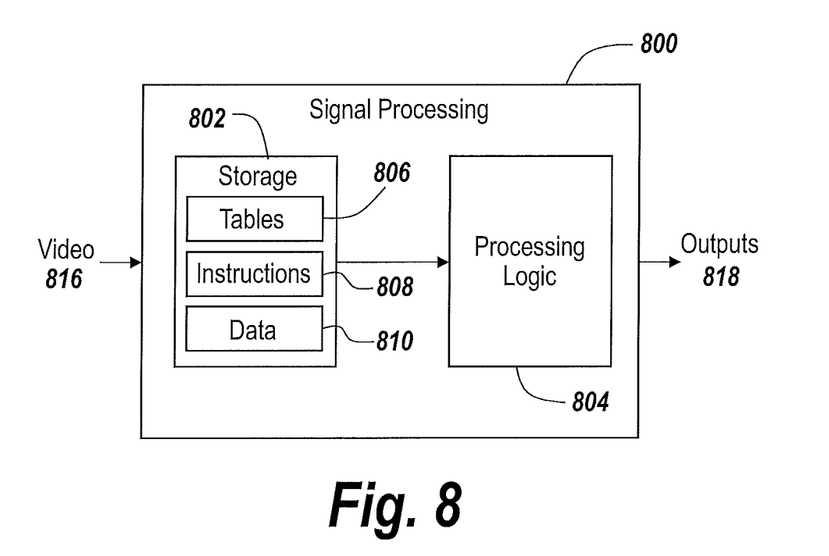
FIG. 8 depicts a diagram of a signal processing components suitable for use in exemplary embodiment.
Figure 9:
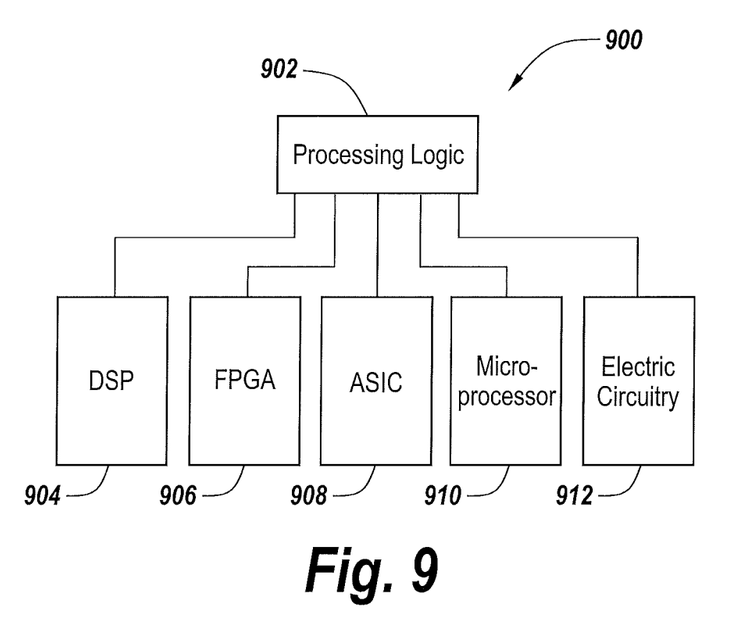
FIG. 9 depicts a number of different types of processing logic that may be used in an exemplary embodiment.

As shown in FIG. 8, the output from the RF activity detector 700 is passed as input 816 to the signal processing component (shown as 610 in FIG. 6). FIG. 8 shows an example signal processing component 800 in more detail. The signal processing component includes a storage 802 and processing logic 804. The storage 802 may include various tables 806 and other data 810. Moreover, instructions 808 may be stored in the storage 802 for execution by the processing logic 804. As shown in the block diagram 900 of FIG. 9, the processing logic 902 may take many different forms. The processing logic may be realized as a digital signal processor (DSP) 904, as an FPGA 906, as an ASIC 908, as a microprocessor 910 or as electric circuitry 912. The processing logic 804 processes the video input 816 (FIG. 8) to generate the outputs 818 that may be passed to the marine electronic device 614 (FIG. 6).

Figure 10:
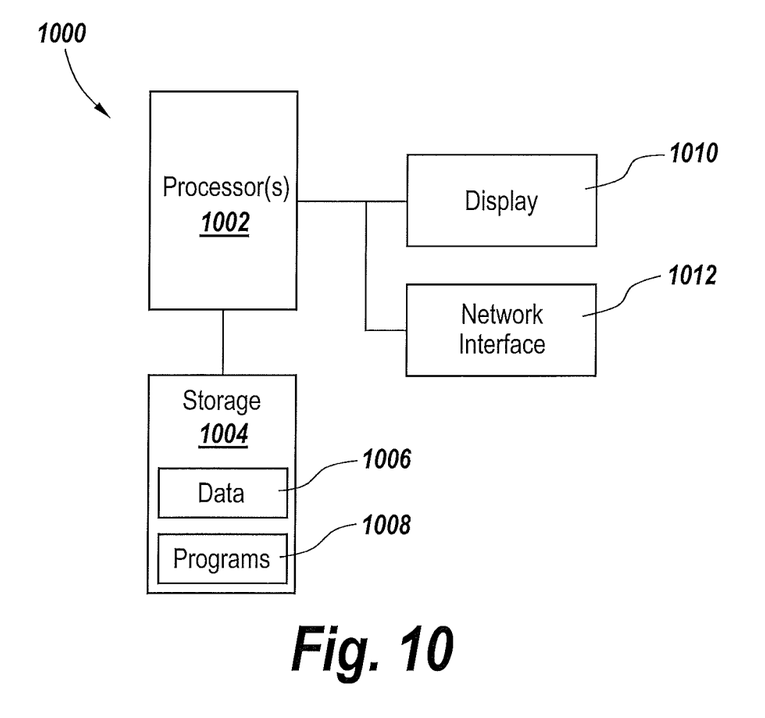
FIG. 10 shows an example of components of a marine electronics device that may be deployed in an exemplary embodiment.

FIG. 10 depicts an example of some of the components 1000 that may be found in the marine electronic device 614. The marine electronic device 614 may include one or more processors 1002, such as microprocessors, that have access to a storage 1004. The storage may hold data 1006 as well as executable programs 1008. The processors 1002 may execute the programs 1008 to realize desired functionality. The processors 1002 may be coupled to a display 1010 for displaying video and/or audio output. The processors 1002 may also be coupled to a network interface 1012 for interfacing the marine electronic device with a network, such as a wireless network, cellular network or other type of network. The programs 1008 may receive the radar outputs and determine the appropriate response. This may entail simply displaying the radar output on the display 1010 or may entail responding to the radar outputs. For example, dangerous objects or possibly impending crashes may be identified and the identification may trigger a video/audio alarm.

As mentioned above, the MIMO radar assembly of the exemplary embodiments may be used to perform beamforming. With beamforming, elements may be combined in such a way that signals of particular angles experience constructive interference where others experience destructive interference. The beamforming can be used both at the transmitting and receiving ends in order to achieve spatial selectivity.

As was discussed above, the MIMO radar assembly of exemplary embodiments may be used to form multiple beams at once. As such, it is possible to rotate MIMO radar assembly at much higher speed than conventional radar arrays. It is also possible to dwell on each target for a longer time to improve target detection performance. This longer time of dwelling on objects allows better Doppler resolution to be able to more readily discriminate between slow moving targets and stationary targets.

Figure 11:
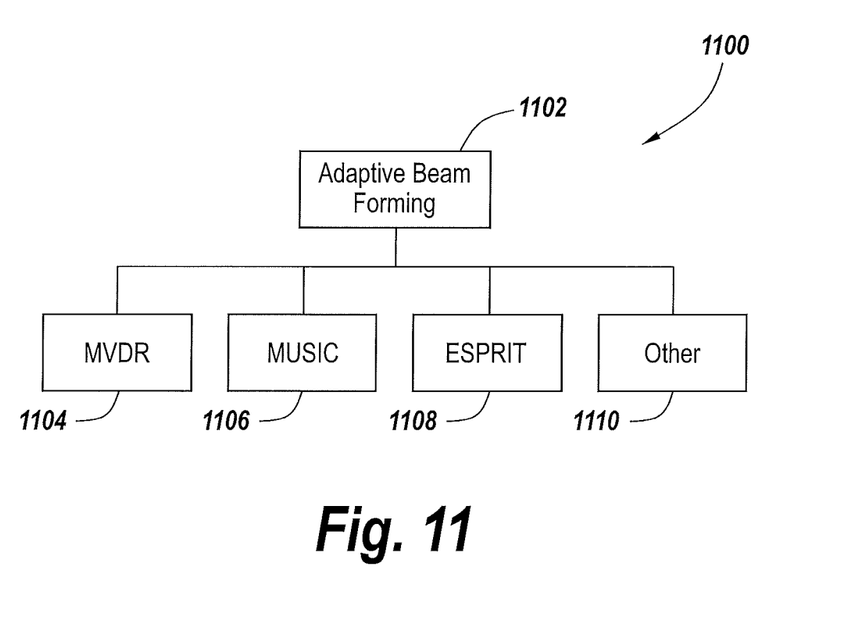
FIG. 11 depicts a diagram of various types of adaptive beamforming that may be used in an exemplary embodiment.

The exemplary embodiments may use a number of different adaptive beamforming techniques. As shown in the diagram 1100 of FIG. 11, adaptive beam forming 1102 may include MVDR 1104 beam forming techniques, MUSIC beam forming techniques 1106 and ESPRIT beamforming techniques 1108. These are established known adaptive beamforming techniques. Other beamforming techniques 1110 may also be used in some exemplary embodiments.

While exemplary have been described herein, those skilled in the art will appreciate the various changes in form and detail may be made without departing from the intended scope of the present invention as defined in the appended claims.

The invention claimed is:

1. A marine multiple input multiple output (MIMO) radar system, comprising:
    a rotating MIMO antenna assembly comprising at least two transmitting antennae for transmitting signals and at least two receiving antennae for receiving reflected signals, wherein the at least two transmitting antennae emit multiple orthogonal signals at a same time; and
    control circuitry for controlling the MIMO antenna assembly to perform adaptive beamforming while forming multiple different beams simultaneously,
    wherein the system includes a housing for housing the antennae and control circuitry, and wherein the housing has a diameter of less than 25 inches.

2. The marine MIMO radar system of claim 1, wherein the transmitting antennae and the receiving antennae are co-located such that the transmitting antennae and the receiving antennae are aligned in a vertical plane.

3. The marine MIMO radar system of claim 1, wherein the transmitting antennae each have multiple elements arranged vertically in a column.

4. The marine MIMO radar system of claim 1, wherein at least one of the antennae elements acts as both one of the transmitting antennae and one of the receiving antennae.

5. The marine MIMO radar system of claim 1, wherein each of the antennae contains at most 10 antenna elements.

6. The marine MIMO radar system of claim 1, wherein the adaptive beamforming is in accordance with one of the following:
- multiple signal classifier (MUSIC) adaptive beam forming; estimation of signal parameters via rotational invariance technique (ESPRIT) adaptive beam forming or minimum variance distortionless response (MVDR) adaptive beam forming.

7. The marine MIMO radar system of claim 1 wherein the MIMO antenna assembly includes at least twice as many receiving antennae as transmitting antennae.

8. A system, comprising:
- a rotating multiple input multiple output (MIMO) antenna assembly comprising at least two transmitting antennae for transmitting signals and at least two receiving antennae for receiving reflected signals, wherein the at least two transmitting antennae emit multiple orthogonal signals at a same time;
- control circuitry for controlling the MIMO antenna assembly to perform beamforming while forming multiple different beams simultaneously;
- a rotational assembly for rotating the MIMO antenna assembly over a range; and
- a marine electronic device for display of a radar image from the rotating MIMO antenna assembly,
- wherein the MIMO antenna assembly has a diameter of less than 13 inches.

9. The system of claim 8, wherein the rotational assembly rotates the MIMO antenna assembly through a continuous arc of at least 180°.

10. The system of claim 9, wherein the rotational assembly rotates the MIMO antenna assembly through a continuous arc at 360°.

11. The system of claim 8, wherein some of the antennae in the MIMO antenna assembly are used both for transmitting and for receiving.

12. The system of claim 8 further comprising a housing that houses the MIMO antenna assembly, the control circuitry and the rotational assembly.

13. The system of claim 12, wherein the housing has a domed configuration.

14. A method, comprising:
- causing a rotating multiple input multiple output (MIMO) marine radar assembly to emit multiple signals and perform beamforming while forming multiple different beams simultaneously, wherein the MIMO marine radar assembly comprises at least two transmitting antennae for transmitting signals and at least two receiving antennae for receiving reflected signals, wherein the at least two transmitting antennae emit multiple orthogonal signals at a same time, wherein the MIMO marine radar assembly includes a housing that has a diameter of less than 25 inches;
- receiving reflected signals at the MIMO marine radar assembly; and
- processing the received reflected signals with electrical processing logic to generate video output of at least one object off of which the reflected signals reflected.

15. The method of claim 14, further comprising displaying the video output on a display device.

16. The method of claim 14, wherein the MIMO marine radar assembly is rotating when the assembly receives the reflected signals and/or when the assembly emits signals.

* * * * *